United States Patent

Sasaki et al.

[11] Patent Number: 5,978,339
[45] Date of Patent: Nov. 2, 1999

[54] RECORDING/REPRODUCING APPARATUS WITH A BUFFER MEMBER USED FOR MOUNTING A MECHANISM BODY

[75] Inventors: Shinkichi Sasaki; Harutaka Sekiya; Takashi Nakai, all of Fukushima-ken, Japan

[73] Assignees: Alps Electric Co., Ltd.; Nintendo Co., Ltd., both of Japan

[21] Appl. No.: 08/846,005

[22] Filed: Apr. 25, 1997

[30] Foreign Application Priority Data

May 2, 1996 [JP] Japan ................................. 8-111422

[51] Int. Cl.⁶ .................................................. G11B 33/02
[52] U.S. Cl. ............................................................ 369/75.1
[58] Field of Search ................................. 369/75.1, 75.2, 369/77.1; 174/52.1, 65 G, 65 R

[56] References Cited

U.S. PATENT DOCUMENTS 5,038,000  8/1991  Westbrook et al. ..................... 174/52.1

FOREIGN PATENT DOCUMENTS 4-245094   9/1992   Japan ...................................... 369/75.1
4-349266  12/1992   Japan ...................................... 369/75.1
6-66110    8/1994   Japan .
7-31431    7/1995   Japan .

*Primary Examiner*—Allen T. Cao
*Attorney, Agent, or Firm*—Brinks Hofer Gilson & Lione

[57] ABSTRACT

A panel (3) having an inlet (12) for a disc cartridge (13) is attached to the front side of a mechanism body (2) consisting of a chassis, a magnetic head, etc., and the mechanism body (2) is elastically attached to the inner sides of upper and lower cases (6) and (7) through the intermediation of a plurality of buffer rubber members (11). The upper and lower cases (6) and (7) are integrally joined together to form a casing (1), and a buffer member (5) is attached to an opening (4) formed on the front side of the casing (1). This buffer member (5) has a rectangular frame-like through-hole (17) at its center, and holding members (5a) and (5b) formed around it are inserted into holding grooves (7c) formed in the cases (6) and (7). Further, a frame member (5c) is formed on the back side of the buffer member (5) so as to surround the through-hole (17), and the panel (3) is inserted into the frame member (5c) and exposed through the opening (4).

3 Claims, 5 Drawing Sheets

RECORDING/REPRODUCING APPARATUS WITH A BUFFER MEMBER USED FOR MOUNTING A MECHANISM BODY

BACKGROUND OF THE INVENTION

1. Field of the Invention

The present invention relates to a recording/reproducing apparatus in which a cartridge is inserted into a mechanism body through an inlet to thereby effect recording and reproduction on and from a recording medium accommodated in the cartridge and, in particular, to a recording/reproducing apparatus in which the mechanism body is mounted to the interior of a casing.

2. Description of the Related Art

For example, in a magnetic recording/reproducing apparatus in which information is recorded and reproduced on and from a magnetic disc accommodated in a disc cartridge, a panel is mounted to the front side of a mechanism body having a driving mechanism, and the disc cartridge is inserted through an inlet provided in this panel, whereby information is recorded and reproduced on and from the magnetic disc by using a magnetic head provided in the mechanism body.

In the field of game equipment, etc., there has conventionally been known a magnetic recording/reproducing apparatus whose casing accommodates a mechanism body, with a panel being exposed through an opening provided on the front side of the casing. In such a known magnetic recording/reproducing apparatus, the mechanism body is mounted to the inner bottom surface of the casing through the intermediation of a buffer rubber member, and a small gap is provided between the panel and the opening, whereby any impact applied from the outside to the casing is absorbed by the buffer rubber member and prevented from reaching the mechanism body.

However, the above-described conventional magnetic recording/reproducing apparatus has a problem in that while it can protect the mechanism body from damage by virtue of the buffer rubber member in the case of a relatively weak impact, it is liable to suffer damage when a strong impact is applied as in the case in which the casing falls, causing the panel to hit against the edge of the opening of the panel. Further, if the impact is not so strong, there is a concern that vibrations will be generated when the panel hits against the edge of the opening of the casing. In particular, when recording/reproduction is performed, with the rear end of the disc cartridge being engaged with the inlet of the panel, the recording/reproducing operation can be adversely affected. Further, since foreign matter such as dust is easily allowed to enter the casing through the gap required to exist between the panel and the opening, the mechanism body arranged inside the casing is liable to be adversely affected.

SUMMARY OF THE INVENTION

In accordance with the present invention, there is provided a recording/reproducing apparatus comprising: a mechanism body which performs recording and reproduction on and from a recording medium accommodated in a cartridge; a panel which is mounted to the front side of the mechanism body and which has an inlet for inserting the cartridge; and a casing which accommodates the mechanism body and which has an opening for exposing the panel, wherein a buffer member surrounding the panel is mounted to the casing.

The buffer member consists of an elastic rubber material or the like. When this buffer member is formed as a frame, it can be mounted to the casing by utilizing the outer peripheral edge thereof.

When a pair of upper and lower cases joined together through a portion extending across the opening are used as the casing, and holding grooves in which the outer peripheral edge of the buffer member is to be inserted are formed in the interior of these cases, the buffer member can be easily mounted to the casing by integrally joining the two cases together, with the outer peripheral edge of the buffer member being held in the holding grooves.

DESCRIPTION OF THE PREFERRED EMBODIMENTS

An embodiment of the present invention will now be described with reference to the drawings.

Figure 1:
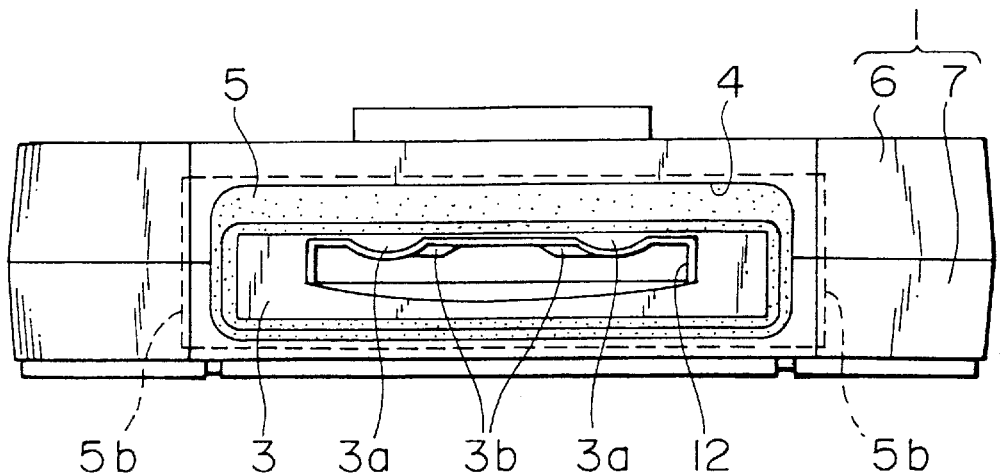
FIG. 1 is a front view of a magnetic recording/reproducing apparatus according to an embodiment of the present invention.
Figure 2:
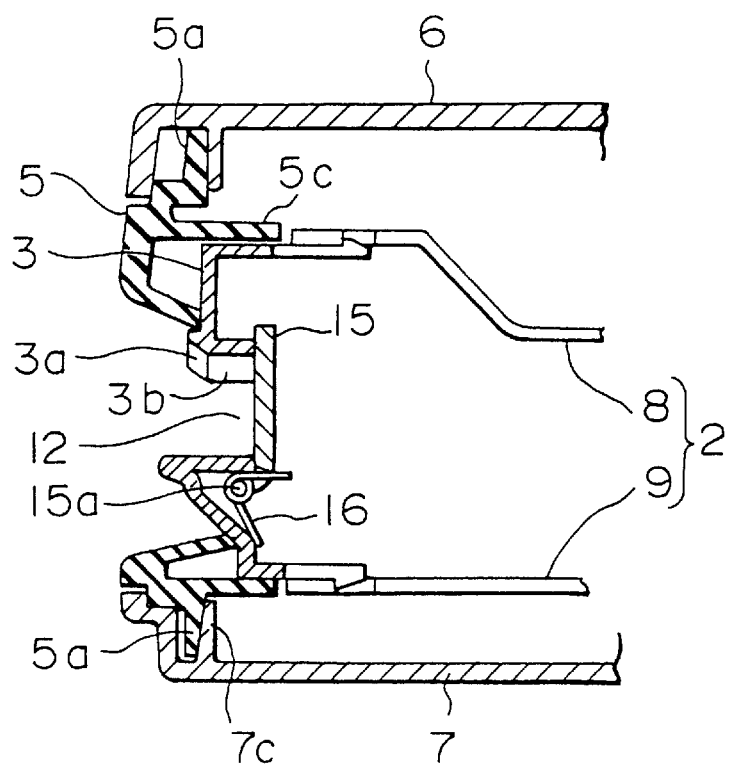
FIG. 2 is a sectional view showing the essential part of the magnetic recording/reproducing apparatus.
Figure 3:
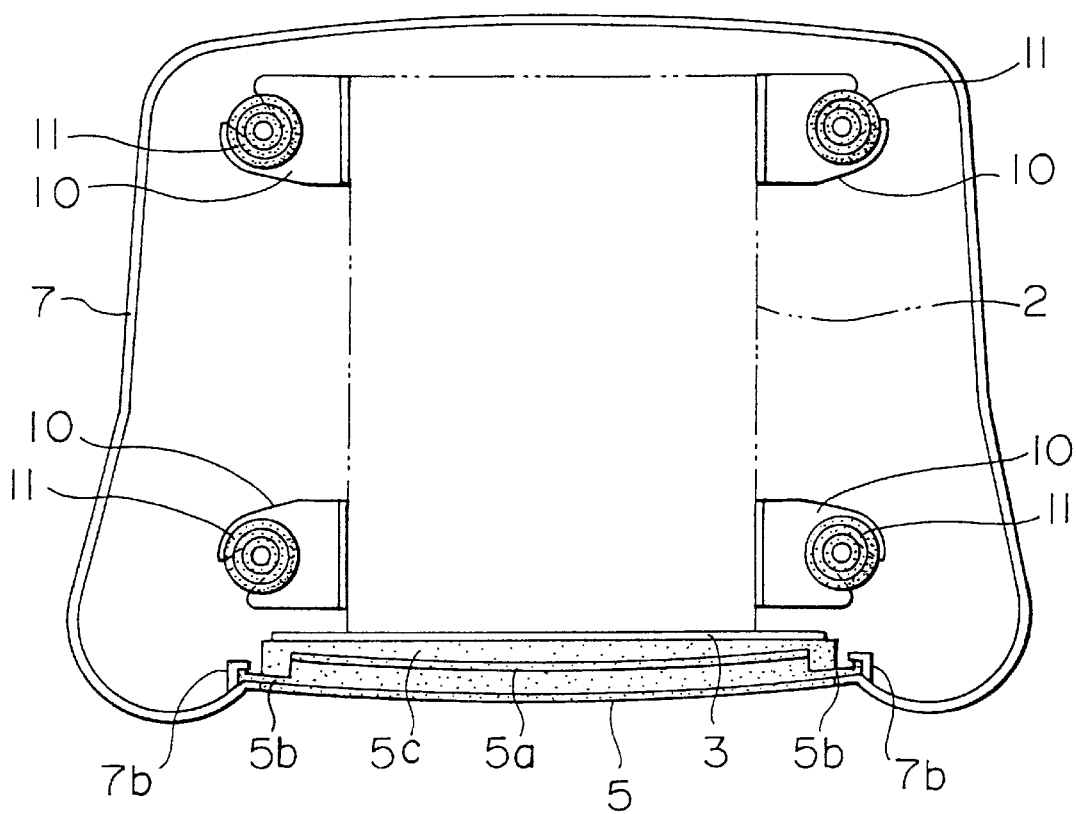
FIG. 3 is a plan view of the magnetic recording/reproducing apparatus with the upper case removed therefrom.

As shown in FIGS. 1 through 3, the magnetic recording/reproducing apparatus of this embodiment is generally composed of a casing 1 forming the housing of the apparatus, a mechanism body 2 provided inside this casing 1, a panel 3 attached to the front side of the mechanism body 2, and a buffer member 5 mounted to an opening 4 on the front side of the casing 1. The casing 1 is composed of upper and lower cases 6 and 7, which can be separated from each other by a line extending across the central portion of the opening. These cases 6 and 7 are integrally joined together by means of screws or the like.

Figure 4:
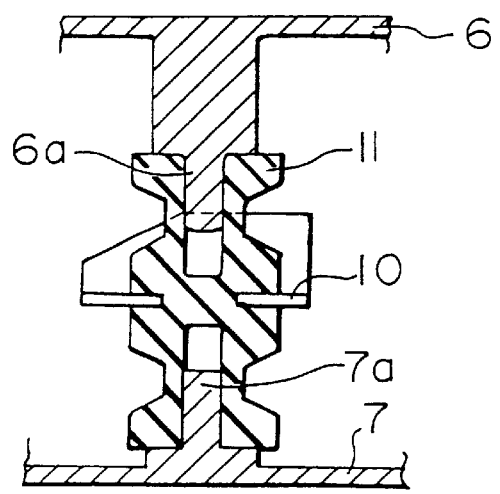
FIG. 4 is a sectional view showing how the mechanism body is mounted.

The mechanism body 2 includes a holder 8 and a chassis 9 and, further, a magnetic head transfer mechanism, etc. (not shown), with a plurality of mounting members 10 being secured to both sides of the chassis 9. As shown in FIG. 4, a central portion consisting of a buffer rubber member 11 is forced into each mounting member 10, and bosses 6a and 7a protruding from the upper and lower cases 6 and 7, respectively, are forced into the upper and lower end portions of the buffer rubber members 11. Thus, the mechanism 2 is elastically attached to the inner sides of the upper and lower cases 6 and 7 through the intermediation of a plurality of buffer rubber members 11.

Figure 5:
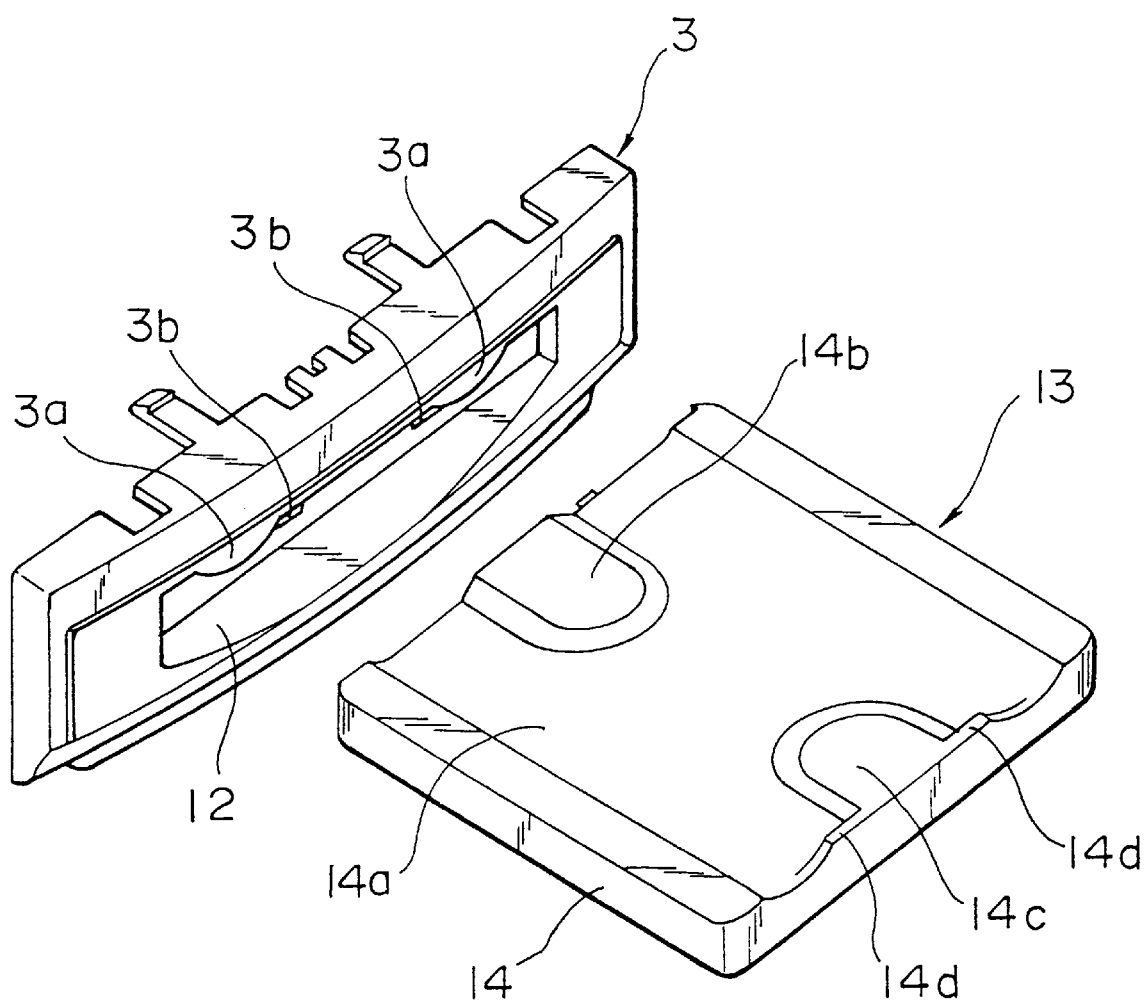
FIG. 5 is a perspective view showing a front panel and a disc cartridge.

As shown in FIG. 5, an inlet 12 is provided in the panel 3, so that a disc cartridge 13 can be inserted into the interior of the magnetic recording/reproducing apparatus through this inlet 12. This disc cartridge 13 is composed of a cartridge case 14 formed of hard synthetic resin, a magnetic disc (not shown) rotatably accommodated in the cartridge case 14, and a shutter (not shown) arranged such that it can reciprocatively move from the front side of the cartridge case 14 along the lower side thereof, the shutter being biased in one direction. The upper surface of the cartridge case 14 has protrusions and a recess, and, in the recess 14a, there are formed first and second swelled portions 14b and 14c situated at the front and rear ends of the cartridge case 14. The swelled portions 14b and 14c are arranged in the same line and their widths are set to be the same. However, stopper protrusions 14d are formed at both sides of the rear end of the second swelled portion 14c. These stopper protrusions 14d continuously extend from the bottom surface of the recess 14a to the upper side of the second swelled portion 14c.

In the panel 3, a pair of protrusions 3a protruding downwards from the upper side of the inlet 12 and a pair of reverse-insertion preventing sections 3b situated on the inner side of these protrusions 3a. The protrusions 3a are substantially flush with the opening plane of the inlet 12. The reverse-insertion preventing sections 3b are recessed in the inlet 12 as compared with the protrusions 3a. Thus, there is a step between them. As shown in FIG. 1, when seen from the front side of the inlet 12, the contour of the protrusions 3a alone is substantially in conformity with the configuration of the recess 14a formed on the rear end surface of the cartridge case 14, and the contour of the protrusions 3a as put together with the reverse-insertion preventing sections 3b is substantially in conformity with the configuration of the recess 14a of the front end surface of the cartridge case 14. As shown in FIG. 2, this panel 3 is snapped onto a holder 8 and a chassis 9, which are the components of the mechanism body 2, and a plate-like door 15 is rotatably supported on the back side of the panel 3. A torsion coil spring 16 is wound around a rotation axle 15a of this door 15, and the door 15 is biased by the resilient force of the torsion coil spring 16 so as to close the inlet 12.

Figure 6:
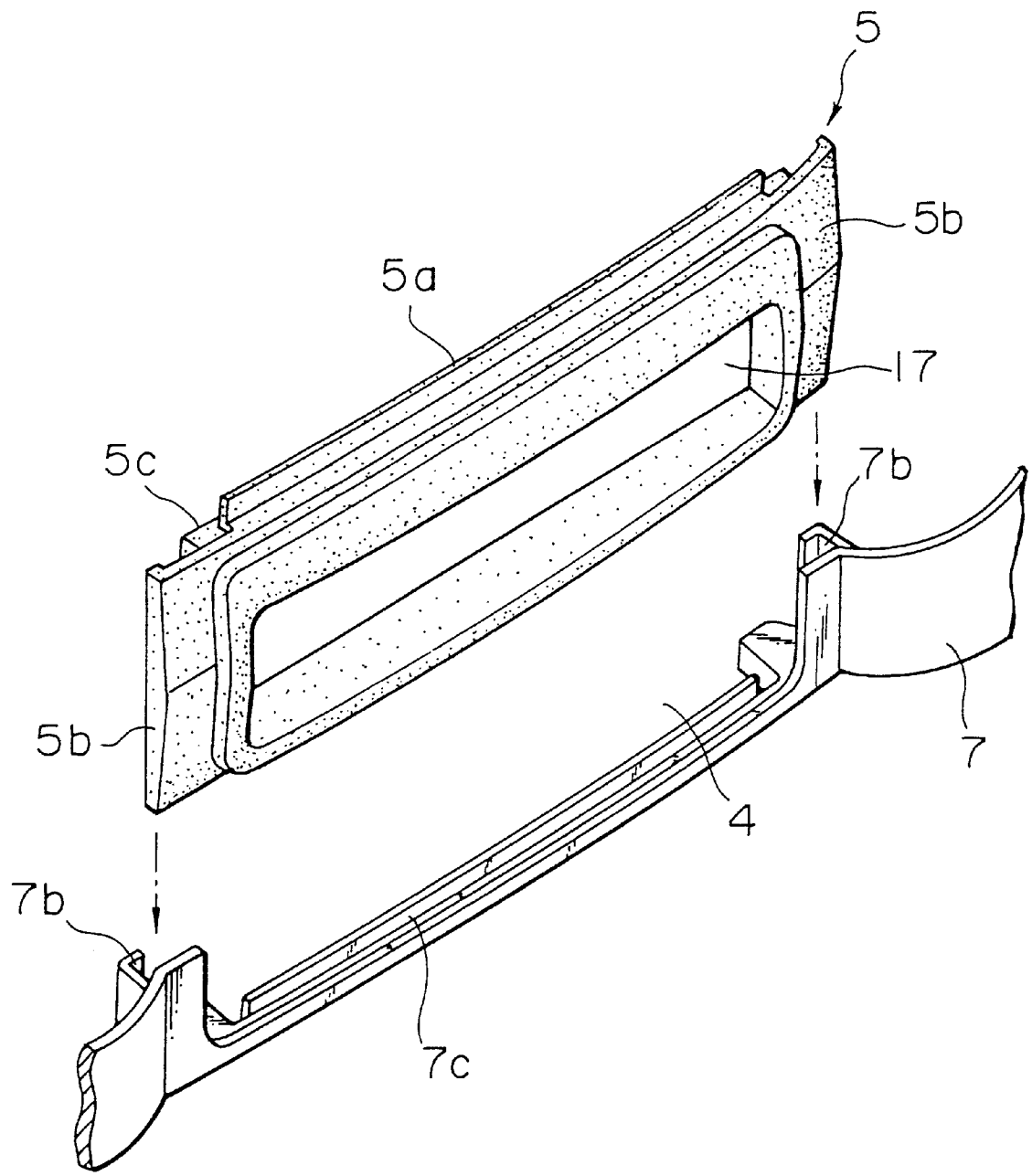
FIG. 6 is a partial perspective view showing a buffer member and the lower case.

As shown in FIG. 6, the buffer member 5 is formed of an elastic rubber material, and is formed as a frame having a rectangular through-hole 17 in the middle portion thereof. Around this buffer member 5, there are formed a vertically extending holding member 5a and a horizontally extending holding member 5b. On the back side of the buffer member 5, a frame member 5c is formed so as to surround the through-hole 17 (See FIG. 2). Further, in the interior of the lower case 7, there are formed vertically extending holding grooves 7b and a horizontally extending holding groove 7c. Similar holding grooves are formed in the interior of the upper case 6.

The magnetic recording/reproducing apparatus, constructed as described above, is assembled as follows: first, the door 15 is mounted into the panel 3, and the panel 3 is snapped onto the holder 8 and the chassis 9 of the mechanism body 2. Then, the panel 3 is inserted into the through-hole 17 of the buffer member 5. Then, while forcing the holding member 5b of the buffer member 5 into the holding grooves 7b of the lower case 7, the holding member 5a at the lower end is inserted into the holding groove 7c. At the same time, each buffer rubber member 11 is forced into the boss 7a of the lower case 7. Then, the upper case 6 is placed on the lower case 7, and the holding member 5a of the buffer member 5 is inserted into the holding groove of the upper case 6 and, at the same time, the boss 6a of the upper case 6 is forced into each buffer rubber member 11. Finally, the two cases 6 and 7 are integrally joined together by means of screws. As a result, as shown in FIGS. 1 and 2, the buffer member 5 is held between the cases 6 and 7, and the outer peripheral surface of the panel 3 is surrounded by the frame member 5c of the buffer member 5. Thus, if an impact is applied to the casing 1, this impact is absorbed by deformation of each buffer rubber member 11 and the buffer member 5, whereby the panel 3 is prevented from being damaged when it hits against the edge portion of the opening 4.

Figure 7:
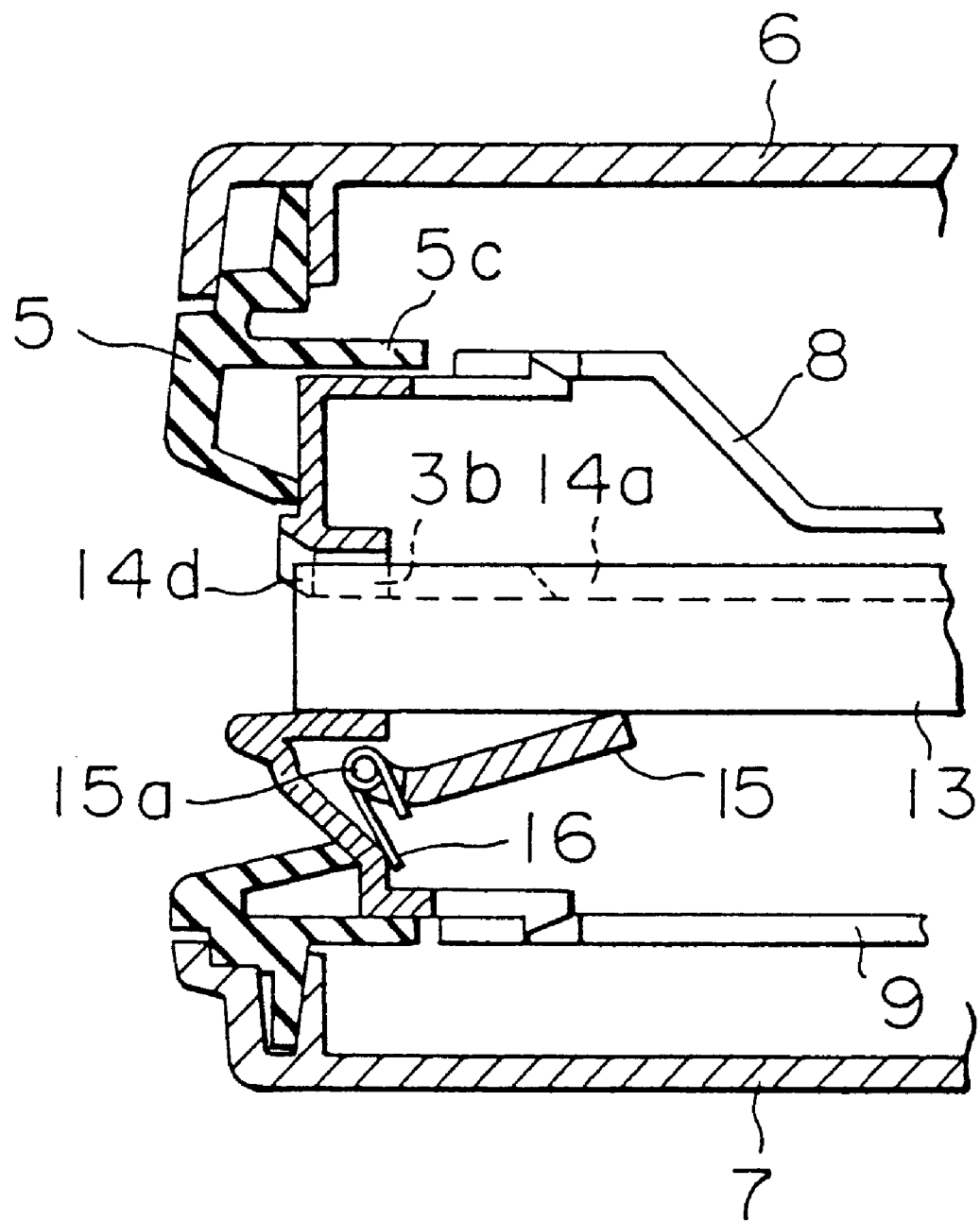
FIG. 7 is a sectional view showing how the disc cartridge is fitted.

When using the apparatus, the disc cartridge 13 is inserted into the inlet 12 from the front side thereof. Then, the door 15 is pushed by the front side of the disc cartridge 13 and rotates, and, as shown in FIG. 7, the disc cartridge 13 is inserted to a loading position inside the holder 8. At this loading position, the shutter of the disc cartridge 13 is opened, and the magnetic head (not shown) of the mechanism body 2 enters the first swelled portion 14b, whereby the recording/reproduction of information is effected. Further, at this loading position, the stopper protrusions 14d at the rear end of the disc cartridge 13 abut the reverse-insertion preventing sections 3b, with the result that no further insertion of the disc cartridge is possible, and the rear end surface of the cartridge case 14 is substantially flush with the opening plane of the inlet 12, so that the inlet 12 is completely closed by the rear end surface of the disc cartridge case 14 and the protrusions 3a. Any impact applied when the disc cartridge 13 is attached is absorbed by each buffer rubber member 11 and the buffer member 5, so that the positional relationship between the mechanism body 2, the panel 3 and the disc cartridge 13 undergoes practically no change, so that the recording/reproducing operation is not adversely affected.

What is claimed is:

1. A recording/reproducing apparatus comprising:

a mechanism body which performs recording and reproduction on and from a recording medium accommodated in a cartridge;

a panel which is mounted to a front side of the mechanism body and which has an inlet for inserting the cartridge, a front surface, and an outer peripheral surface;

a casing which accommodates the mechanism body and which has an opening for exposing the panel, wherein said casing comprises upper and lower cases joined together through a portion extending across said opening, the upper and lower cases each comprising a horizontally-extending holding groove and a vertically-extending holding groove; and a buffer member comprising:
   a horizontally-extending holding member inserted into the horizontally-extending holding grooves of the upper and lower cases;
   a vertically-extending holding member inserted into the vertically-extending holding grooves of the upper and lower cases; and
   a frame member abutting the front surface of the panel and surrounding the outer peripheral surface of the panel.

2. The recording/reproducing apparatus according to claim 1 further comprising:

a plurality of mounting members fastened to two sides of the mechanism body; and a plurality of buffer rubber members, wherein each of a central portion of the respective plurality of buffer rubber members being forced into each mounting member of the plurality of mounting members.

3. The recording/reproducing apparatus according to claim 2, wherein the casing further comprises a plurality of bosses protruding from the upper and lower cases and forced into upper and lower end portions of the buffer rubber members, whereby the mechanism body is elastically attached to the upper and lower cases through the plurality of buffer rubber members.

* * * * *